(12) United States Patent
Felip Leon et al.

(10) Patent No.: US 11,536,574 B2
(45) Date of Patent: Dec. 27, 2022

(54) SYSTEM AND METHOD FOR ACCELERATION-BASED VECTOR FIELD MAPS

(71) Applicant: Intel Corporation, Santa Clara, CA (US)

(72) Inventors: Javier Felip Leon, Hillsboro, OR (US); Ignacio J. Alvarez, Portland, OR (US); Maria Soledad Elli, Hillsboro, OR (US); David I. Gonzalez Aguirre, Hillsboro, OR (US); Javier Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 16/728,849

(22) Filed: Dec. 27, 2019

(65) Prior Publication Data

US 2020/0149898 A1    May 14, 2020

(51) Int. Cl.
*G01C 21/32* (2006.01)
*G01C 21/16* (2006.01)
*G05D 1/00* (2006.01)
*G05D 1/02* (2020.01)

(52) U.S. Cl.
CPC ............. *G01C 21/32* (2013.01); *G01C 21/16* (2013.01); *G05D 1/0088* (2013.01); *G05D 1/027* (2013.01); *G05D 2201/0213* (2013.01)

(58) Field of Classification Search
None
See application file for complete search history.

(56) References Cited

U.S. PATENT DOCUMENTS

2019/0051179 A1\* 2/2019 Alvarez ................ H04W 12/63
2019/0197029 A1   6/2019 Gonzalez Aguirre et al.

OTHER PUBLICATIONS

Christian Forster et al., "IMU Preintegration on Manifold for Efficient Visual-Inertial Maximum-a-Posteriori Estimation", 2015.
Julia Ebling et al., "Clifford Fourier Transform on Vector Fields", IEEE Transactions on Visualization and Computer Graphics, vol. 11, No. 4, Jul./Aug. 2005.
Raul Mur-Artal et al., "Visual-Inertial Monocular SLAM with Map Reuse", IEEE Robotics and Automation Letters, vol. 2, No. 2, Apr. 2017.
Xiaqing Ding et al. "Laser Map Aided Visual Inertial Localization in Changing Envimoment", 2018 IEEE/RSJ International Conference on Intelligent Robos and Systems (IROS) Madrid, Spain, Oct. 1-5, 2018.

\* cited by examiner

*Primary Examiner* — Thomas E Worden
(74) *Attorney, Agent, or Firm* — Banner & Witcoff Ltd.

(57) ABSTRACT

In an autonomous vehicle system, data received from one or more autonomous vehicles (AVs) can be aggregated to generate aggregated data. From this aggregated data, a vector-field map can be generated that includes a plurality of cells. Each of the cells can include a corresponding vector. The vector field map can be analyzed to identify one or more vectors of the plurality of cells that exceed one or more predetermined threshold values. The analysis can include a magnitude analysis and/or a frequency analysis. Based on the analysis, traffic and/or road conditions can be determined, which can provide prior knowledge about the driving behavior of other vehicles. Advantageously, aspects of the disclosure improve predictive motion models and enhance navigation algorithms.

24 Claims, 11 Drawing Sheets

SYSTEM AND METHOD FOR ACCELERATION-BASED VECTOR FIELD MAPS

TECHNICAL FIELD

Aspects described herein generally relate to acceleration-based vector field map generation, more particularly, to techniques for generating and analyzing acceleration-based vector field maps that may be used by self-driving systems.

BACKGROUND

Autonomous driving vehicles may be equipped with one or more sensors that are used for navigation, trajectory planning and state estimation. Data obtained from these sensors can be used by the respective vehicle, as well as provided to one or more other vehicles and/or remote systems for further processing. The data can be communicated via a Vehicle-to-Everything (V2X) communication system that includes the passing of information from a vehicle to any entity that may affect the vehicle, and vice versa. V2X is a vehicular communication system that incorporates other more specific types of communication, such as Vehicle-to-Infrastructure (V2I), Vehicle-to-Vehicle (V2V), Vehicle-to-Device (V2D), Vehicle-to-Pedestrian (V2P), Vehicle-to-grid (V2G), etc. V2X can include cellular V2X (C-V2X), which includes the more specific types of communication above and can include vehicle-to-network (V2N) communications (e.g., via one or more cellular technologies). V2X is used as an example type of communication for purposes of explanation, but the disclosure is not limited in this respect.

As the technology for self-driving systems advances, so do the safety concerns. Many real-life examples ranging from L1 (driving assistance systems) to L5 (highly automated systems) of deployed and testing systems have demonstrated that driving safety cannot rely solely on probabilistic estimations nor on attentive drivers. This is why formal safety driving models aim to close the safety gap that exists today within self-driving systems. These models leverage data and other information provided by the autonomous driving vehicles (AVs).

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
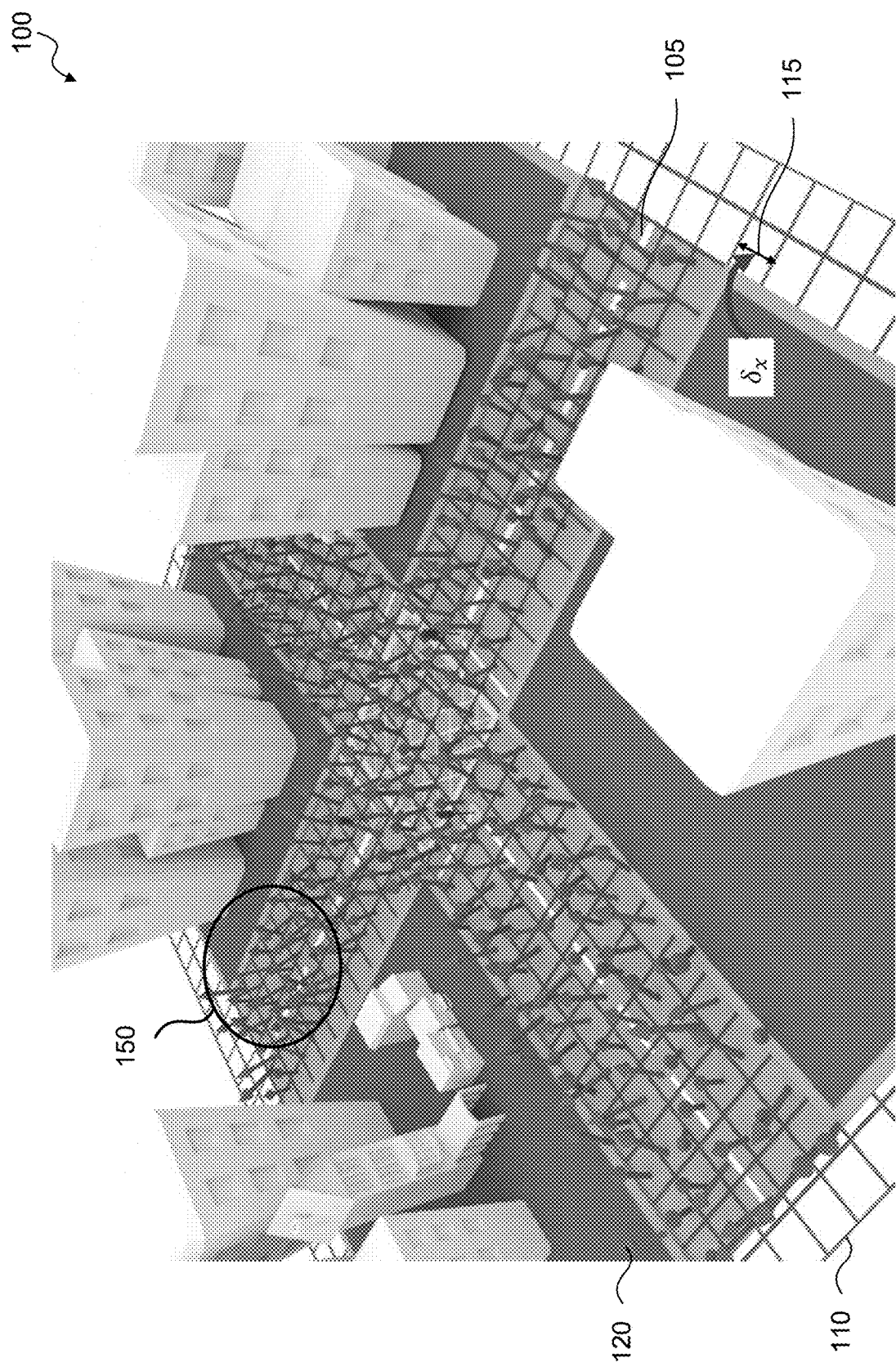
FIG. 1 illustrates an acceleration vector field map in accordance with an aspect of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Autonomous driving vehicles are equipped with a suite of sensors that are used for navigation, trajectory planning and state estimation. In one or more exemplary aspects, the autonomous driving vehicles (AVs) are equipped with one or more inertial measurement (IM) sensor, also referred to as an inertial sensor. The IM sensor(s) can be used for Global Positioning System (GPS) localization and state estimation.

With a fleet of N autonomous vehicles, each vehicle implements its own state estimation capabilities through multiple means, including but not limited to: GPS, IM sensors, Visual Odometry and simultaneous localization and mapping (SLAM). Advantageously, aspects of the present disclosure harness the data from the IM sensors for use beyond state estimation that includes leveraging the acceleration values sensed by IM sensors to generate a spatio-temporal map layer of expected accelerations. Such a map may be used to compute analytics about the traffic and road conditions, provide prior knowledge about the driving behavior of other vehicles to improve predictive motion models, and enhance navigation algorithms.

Aspects include a map generation system that is configured to crowdsource information (e.g. acceleration information) to generate acceleration vector field maps, as well as to process the generated vector field maps to detect salient points in the road to be further analyzed by road and traffic maintenance officials. In other aspects, the acceleration field vector map is used to adapt navigation and prediction engines of autonomous vehicles.

Information obtained from the IM sensor(s) can be stored in a memory of the corresponding AV and/or can be communicated to one or other AVs and/or one or more remote systems. In an exemplary aspect, the IM sensor includes accelerometer, a gyroscope and/or a magnetometer, and can be configured to determine information related to road conditions, driving style, reaction times, and/or one or more other vehicle and/or environmental parameters as would be understood by one of ordinary skill in the art. In exemplary aspects, information from the IM sensors of one or more vehicles, such as acceleration, is processed to generate acceleration-based vector field maps. Advantageously, with the generation of the acceleration-based vector field maps, aspects of the disclosure provide extended context awareness for the AVs and corresponding environment.

In an exemplary aspect, the system is configured to harvest time and space geo-referenced IM sensor signals, through crowdsourcing, from one or more AVs. The harvested information is processed to generate an acceleration-based map layer, which can be used for trajectory prediction, road condition analysis, traffic enhancement, and/or one or more other applications as would be understood by one of ordinary skill in the art. In an exemplary aspect, the autonomous vehicle system utilizes the received crowd-sourced vector-field map for path planning and/or to adjust/influence results or operations of a path planning module.

In an exemplary aspect, with reference to FIG. 1, the system is configured to aggregate sensor data to determine cell-wise statistics of the acceleration-based vector field map 100. In an exemplary aspect, the system is configured to determine the mean, mode, and/or one or more other statistical calculations on the aggregated data to generate the vector field map 100 that contains the expected acceleration per cell. The acceleration-based vector field map 100 includes a grid 110 of cells 105 corresponding to the road or other navigational location. Each cell 105 including an acceleration vector 120 that is determined based on data provided by one or more autonomous vehicles (AVs) 202.1 to 202.n (FIG. 2A).

Figure 2A:
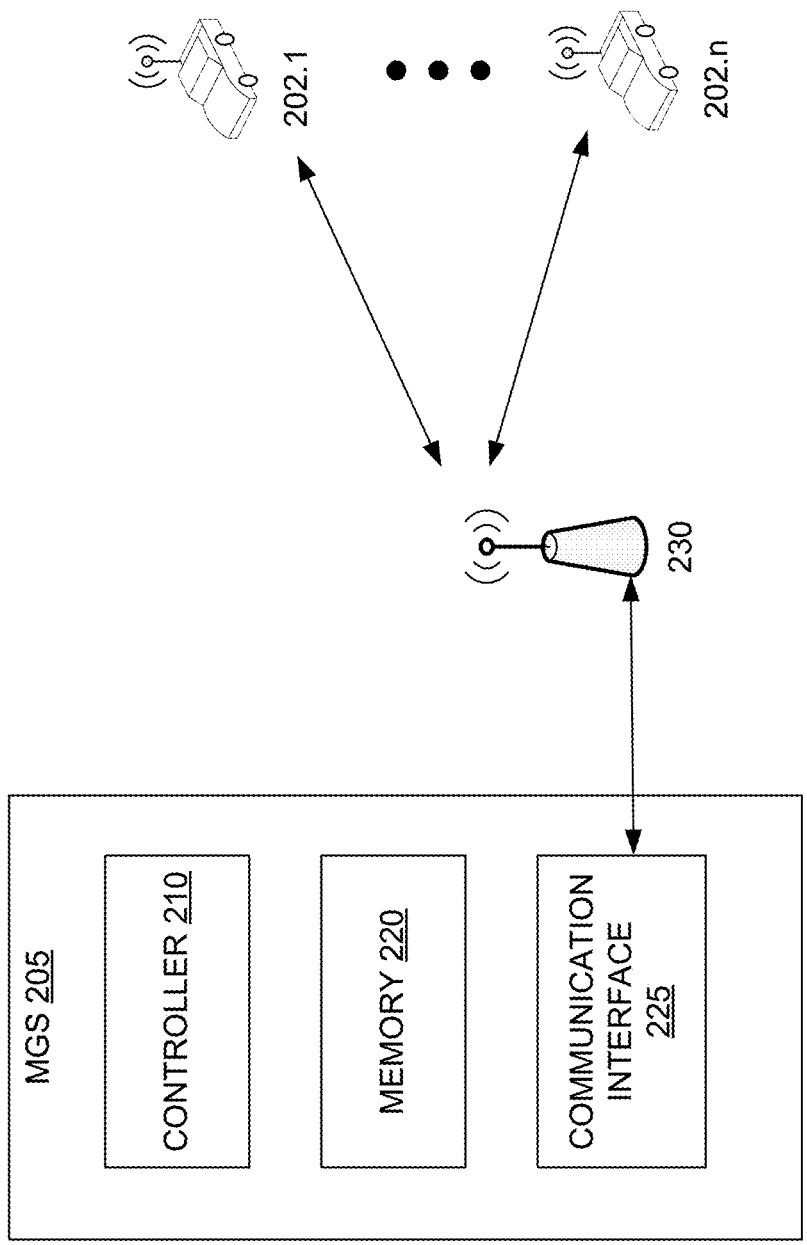
FIG. 2A illustrates a map generation system in accordance with an aspect of the disclosure.

As illustrated in FIG. 2A, the map generation system (MGS) 205 is configured to communicate with one or more autonomous vehicles 202.1 to 202.n to generate the acceleration-based vector field map 100. The communication can use one or more wireless communication protocols, but is not limited thereto. The AVs 202 are further described with reference to FIG. 2B.

In an exemplary aspect, the MGS 205 includes controller 210, memory 220, and a communication interface 225. The memory 220 can store data and/or instructions, where when the instructions are executed by the controlled 210, controls the controller 210 to perform the functions described herein. The memory 220 may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 220 can be non-removable or removable, or a combination of both.

In an exemplary aspect, the communication interface 225 is configured to transmit and/or receive wireless communications via one or more wireless technologies. In an exemplary aspect, the communication interface 225 is includes processor circuitry that is configured for transmitting and/or receiving wireless communications conforming to one or more wireless protocols.

The one or more wireless protocols may include one or more fifth generation (5G) cellular communication protocols, such as 5G protocols, one or more $4^{th}$ Generation cellular communication protocols, one or more 3rd Generation Partnership Project's (3GPP) protocols (e.g., Long-Term Evolution (LTE)), one or more wireless local area networking (WLAN) communication protocols, and/or one or more other communication protocols (e.g. Bluetooth, millimeter wave (mmWave), microwave).

In an exemplary aspect, the communication interface 225 includes a transmitter and a receiver (transceiver) configured for transmitting and receiving wireless communications, respectively, via one or more antennas, access points, and/or base stations 230. In aspects having two or more transceivers, the two or more transceivers can have their own antenna, or can share a common antenna via a duplexer. In an exemplary aspect, the communication interface 225 is configured to perform one or more baseband processing functions (e.g., media access control (MAC), encoding/decoding, modulation/demodulation, data symbol mapping; error correction, etc.). The antenna 230 can include one or more antenna elements forming an integer array of antenna elements. In an exemplary aspect, the antenna 230 is a phased array antenna that includes multiple radiating elements (antenna elements) each having a corresponding phase shifter. The antenna 230 configured as a phased array antenna can be configured to perform one or more beamforming operations that include generating beams formed by shifting the phase of the signal emitted from each radiating element to provide constructive/destructive interference so as to steer the beams in the desired direction.

In an exemplary aspect, the controller 210 includes processor circuity that is configured to control the overall operation of the MGS 205, such as the operation of the communication interface 225. The controller 210 may be configured to control the transmitting and/or receiving of wireless communications via the communication interface 225.

In an exemplary aspect, the controller 210 is configured to perform one or more baseband processing functions (e.g., media access control (MAC), encoding/decoding, modulation/demodulation, data symbol mapping; error correction, etc.) in cooperation with the communication interface 225 or instead of such operations/functions being performed by the communication interface 225. The controller 210 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the MGS 205 is configured to receive acceleration data from the AVs 202 using the communication interface 225. The received acceleration data can be stored in memory 220. In an exemplary aspect, the acceleration data is geo-localized by one or more state estimation algorithms of the AV 202. That is, the acceleration data is associated with a corresponding location (e.g. via GPS) and time. The MGS 205 can than then store the acceleration information in a corresponding grid of the vector field map according to its corresponding spatio-temporal coordinates $x(\varphi, \lambda, t)$ (latitude, longitude, time) provided by the AV 202.

The controller 210 is configured to perform one or more processing operations (e.g. aggregation, spatio-temporal vector field generation, frequency analysis, magnitude analysis) on the acceleration data to generate one or more acceleration-based vector field maps 100. The acceleration-based vector field map 100 and/or information derived therefrom can be stored in memory 220 and/or communicated back to one or more of the AVs 202.

In an exemplary aspect, the controller 210 may utilize one or more machine learning models to perform functions of the controller 210, one or more other components of the MGS 205, and/or to control the overall operation of the MGS 205.

In an exemplary aspect, the MGS 205 is configured to perform frequency analysis and/or magnitude analysis on the acceleration-based vector field map 100 to provide road condition information and/or traffic information. For example, road condition information can be used to detect road conditions and/or road hazards. In an exemplary aspect, the MGS 205 perform frequency analysis (e.g. in the frequency domain) on the vector field map to identify which of the cells 115 (e.g. P cells—FIGS. 3-4) include high-frequency components normal to the ground plane. High frequency components may indicate the presence of potholes, bumps or other defects in the road.

In an exemplary aspect, the MGS 205 is configured to perform an analysis of the magnitudes of the vector field map to identify traffic conditions. In an exemplary aspect, the MGS 205 is configured to analyze the sum of magnitudes of vectors during traffic light transitions to adapt traffic control configurations to reduce the overall accelerations in the vicinity.

Figure 2B:
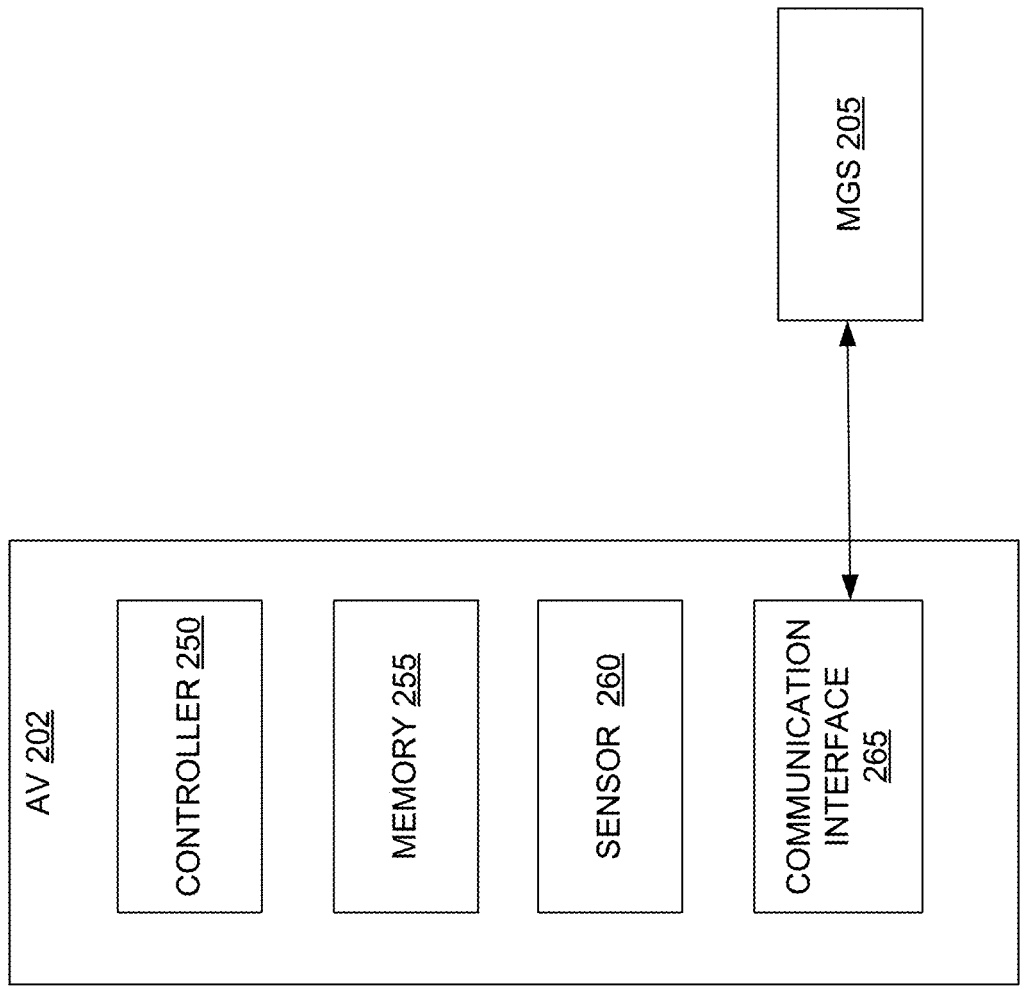
FIG. 2B illustrates an autonomous vehicle in accordance with an aspect of the disclosure.
Figure 3:
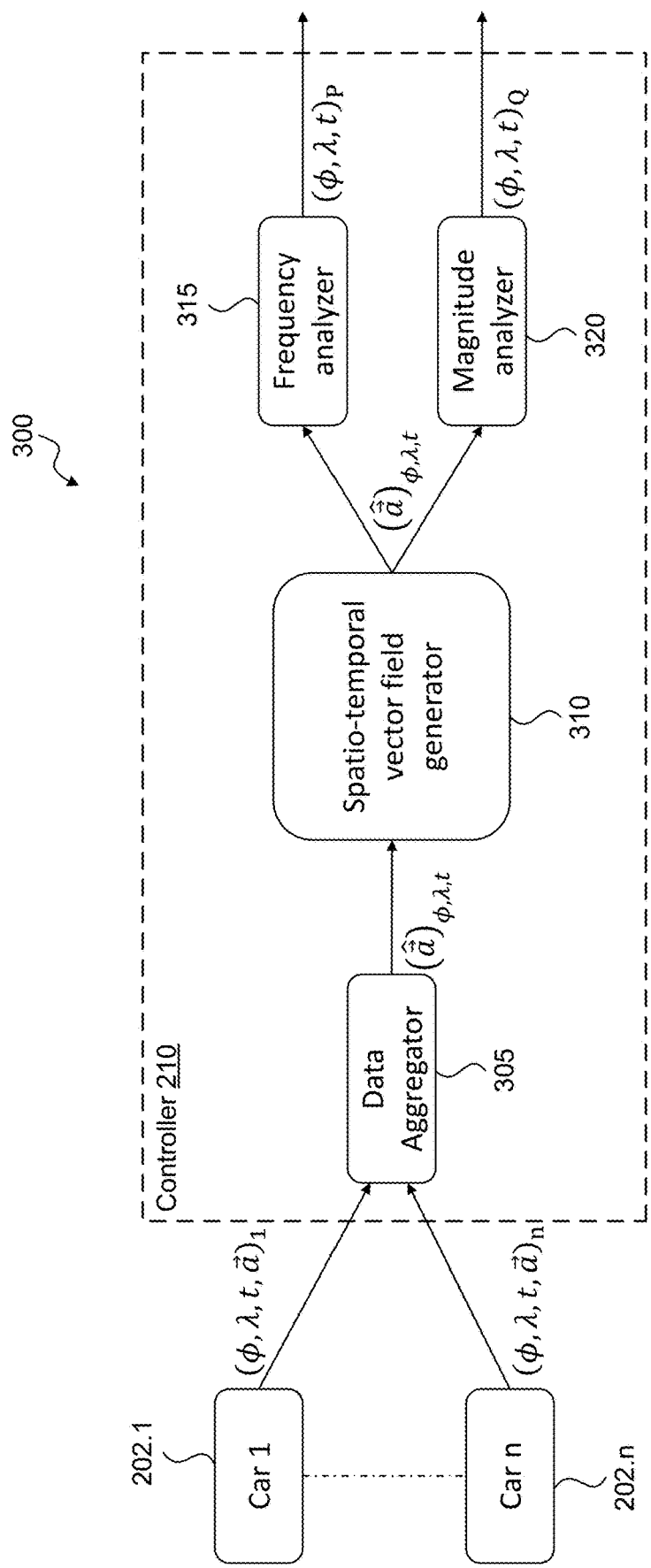
FIG. 3 illustrates a map generation system in accordance with an aspect of the disclosure.

FIG. 3 illustrates an exemplary aspect of the MGS 205. In this aspect, the controller 210 includes a data aggregator 305, a spatio-temporal vector field generator 310, a frequency analyzer 315, and a magnitude analyzer 320. The MGS 205 is configured to receive sensor data from the received from one or more sensors (e.g. sensors 260—FIG. 2B) of the one or more corresponding AVs 202, using the communication interface 225 (shown in FIG. 2A).

The aggregator 305 is configured to aggregate sensor data $(\phi, \lambda, t, \vec{a})_1$ to $(\phi, \lambda, t, \vec{a})_n$ received from one or more sensors (e.g. sensors 260—FIG. 2B) of the one or more corresponding AVs 202. In an exemplary aspect, the sensors (sensors 260) include inertial measurement (IM) sensors, where the sensor data that is aggregated by the aggregator 205 is acceleration data of the corresponding AV 202.

The aggregated acceleration data $(\vec{a})_{\phi, \lambda, t}$ is provided to the spatio-temporal vector field generator 310, which is configured to process the aggregated acceleration data (that may be indexed by latitude, longitude and time) to generate a single acceleration vector 120 for each cell 115 of the vector field map 110. The acceleration vectors 120 form the map represented by $(\hat{\vec{a}})_{\phi, \lambda, t}$ in FIG. 1. In this example, the aggregated acceleration information can be represented as a set of acceleration values: $D(\phi, \lambda, t) \rightarrow \vec{a}_{0:n}$. To generate the single acceleration vector 120, the spatio-temporal vector field generator 310 can perform one or more filtering processing operations, including mean filtering (e.g. compute the average acceleration value from all the readings) and/or robust probabilistic filtering (e.g. a probabilistic outlier rejection method that computes the expected acceleration value by computing the mean after rejecting the outliers).

The vector field map 110 is then provided to the frequency analyzer 315 and the magnitude analyzer 320. The magnitude analyzer 320 can filter the magnitude of the acceleration vectors of the corresponding cells to determine cells/locations where the magnitude of the acceleration exceeds a threshold value, which may be indicative of road and/or traffic conditions 150. The magnitude analyzer 320 can generate an output signal $(\phi, \lambda, t)_Q$ corresponding to the analyzed magnitude for the respective cell. Here, the variables $(\phi, \lambda, t)$ correspond to the latitude, longitude, time, respectively of the corresponding cell.

The frequency analyzer 315 can be configured to perform one or more frequency processing operations, such as a Clifford Fourier transformation. In this example, a high-pass filter may be applied to the Clifford Fourier transform to determine cells/locations that include high frequency components of the vector field. In an exemplary aspect, high frequency components correspond to cell where the acceleration values are fast changing (area 150 in FIG. 1). These fast changing acceleration values may indicate possibly anomalies in the vector field, which may be caused by, for example, poor road conditions. The frequency analyzer 315 can generate an output signal $(\phi, \lambda, t)_P$ corresponding to the analyzed frequencies for the respective cell.

The output signal of the frequency analyzer 315 and/or the output signal of the magnitude analyzer 320 can be used by the MGS 205 to, for example, determine analytics about the traffic and road conditions, identify driving behavior of one or more AVs to improve predictive motion models and/or enhance navigation algorithms. The output signal of the frequency analyzer 315 and/or the output signal of the magnitude analyzer 320 can additionally or alternatively be provided (e.g. wirelessly communicated) to one or more AVs 202 by the MGS 205. As shown in FIG. 2B, which illustrates an AV 202 according to an exemplary aspect, the AVs 202 are configured to communicate with the MGS 205, which can provide the generated acceleration-based vector field map 100, the output signal of the frequency analyzer 315, and/or the output signal of the magnitude analyzer 320, to one or more of the AVs 202. The communication can use one or more wireless communication protocols, but is not limited thereto.

In an exemplary aspect, the AV 202 includes controller 250, memory 255, one or more sensors 260, and a communication interface 265. The memory 255 can store data and/or instructions, where when the instructions are executed by the controlled 250, controls the controller 250 to perform the functions described herein. The memory 255 may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 255 can be non-removable or removable, or a combination of both. The memory 255 can also store an acceleration-based vector field map 100, frequency analysis information, and/or magnitude analysis information.

In an exemplary aspect, the communication interface 265 is configured to transmit and/or receive wireless communications via one or more wireless technologies. In an exemplary aspect, the communication interface 265 is includes processor circuitry that is configured for transmitting and/or receiving wireless communications conforming to one or more wireless protocols.

The one or more wireless protocols may include one or more fifth generation (5G) cellular communication protocols, such as 5G protocols, one or more $4^{th}$ Generation cellular communication protocols, one or more 3rd Generation Partnership Project's (3GPP) protocols (e.g., Long-Term Evolution (LTE)), one or more wireless local area networking (WLAN) communication protocols, and/or one or more other communication protocols (e.g. Bluetooth, millimeter wave (mmWave), microwave).

In an exemplary aspect, the communication interface 265 includes a transmitter and a receiver (transceiver) configured for transmitting and receiving wireless communications, respectively. In an exemplary aspect, the communication interface 265 is configured to perform one or more baseband processing functions (e.g., media access control (MAC), encoding/decoding, modulation/demodulation, data symbol mapping; error correction, etc.).

In an exemplary aspect, the controller 250 includes processor circuitry that is configured to control the overall operation of the AV 202, such as the operation of the communication interface 265 and/or sensor 260. The controller 250 may be configured to control the transmitting and/or receiving of wireless communications via the communication interface 265, and/or processing of sensor information obtained by the sensor 260.

In an exemplary aspect, the controller 250 is configured to perform one or more baseband processing functions (e.g., media access control (MAC), encoding/decoding, modulation/demodulation, data symbol mapping; error correction, etc.) in cooperation with the communication interface 265 or instead of such operations/functions being performed by the communication interface 265. The controller 250 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the controller 250 is configured to utilize the acceleration-based vector field map 100, frequency analysis information, magnitude analysis information, and/or other information derived from or related to the acceleration-based vector field map 100, frequency analysis information, and/or magnitude analysis information to, for example, determine analytics about the traffic and road conditions, and identify driving behavior of one or more AVs to improve predictive motion models and/or enhance navigation algorithms. In an exemplary aspect, the controller 250 may utilize one or more machine learning models to perform functions of the controller 250, one or more other components of the AV 202, and/or to control the overall operation of the AV 202.

The one or more sensors 260 can include one or more inertial measurement (IM) sensors, one or more Global Positioning System (GPS) sensors, and/or more other sensors as would be understood by one of ordinary skill in the art. The IM sensors can include one or more accelerometers, gyroscopes, magnetometers, and/or more other sensors as would be understood by one of ordinary skill in the art.

Figure 4:
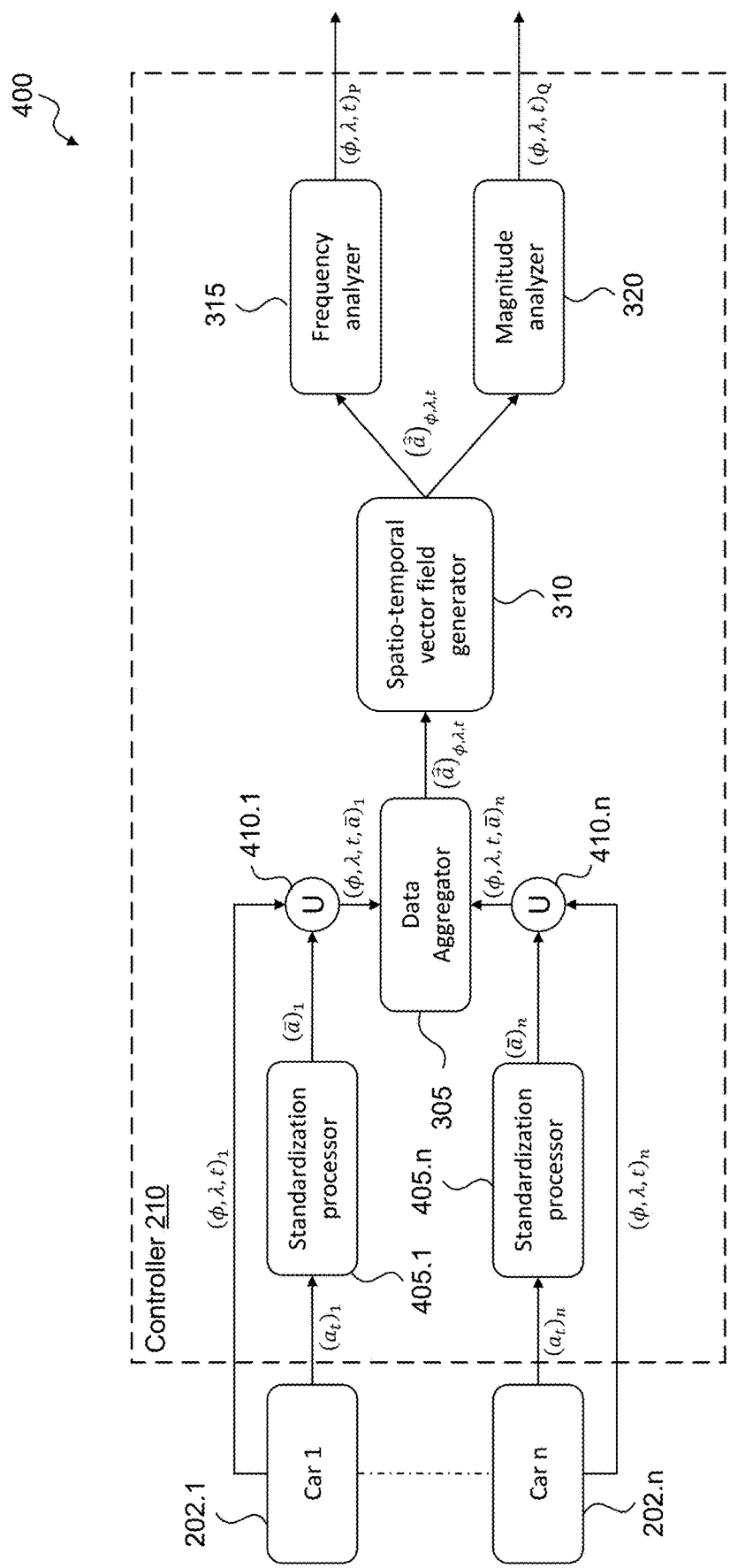
FIG. 4 illustrates a map generation system in accordance with an aspect of the disclosure.

FIG. 4 illustrates an exemplary aspect of the MGS 205. In this aspect, as in the controller 210 described with reference to FIG. 3, the controller 210 includes data aggregator 305, spatio-temporal vector field generator 310, frequency analyzer 315, and magnitude analyzer 320. In this exemplary aspect, the controller 210 also includes a standardization processor 405, which will be described in more detail below. Again, the MGS 205 is configured to receive sensor data from the received from one or more of sensors (e.g. sensors 260—FIG. 2B) of the one or more corresponding AVs 202, using the communication interface 225 (shown in FIG. 2A).

In an exemplary aspect, the MGS 205 is configured to discretize traversable space to a configurable granularity $\delta_x$ (FIG. 1) and discretizes time with another granularity $\delta_t$. Here, the granularity $\delta_x$ corresponds to the cell size for the grid. The granularity $\delta_x$ can be for example, 10 cm, 1 m, or another dimension as would be understood by one of ordinary skill in the art. The acceleration data from the IM sensors 260 (e.g. acceleration $\vec{a}$), which can be geo-localized, are standardized and stored in the specific cell corresponding to the spatio-temporal coordinates $x(\phi, \lambda, t)$ (latitude, longitude, time) provided by the AV 202.

The MGS 205 can be configured to crowd source this information from the AVs 202 using one or more crowd-sourcing methods to create spatio-temporal acceleration profiles that can be employed to support one or more driving tasks (e.g. trajectory prediction, road condition analysis and traffic enhancement). The functions and operations of the MGS 205 as shown in FIG. 4 is provided below.

Standardization

In the example shown in FIG. 4, there is a corresponding standardization processor 405.1 to 405.$n$ for each AV 202.1 to 202.$n$. However, the controller 210 can include a single standardization processor 405 for all AVs 202, or can include a set of standardization processors 405 that are less than the number of AVs 202, where some of the AVs 202 share a common standardization processor 405. In an exemplary aspect, the standardization processors 405, 410 are configured to receive time-series geo-localized data frames from one or more AVs 202. In an exemplary aspect, a data frame is defined as a tuple/ordered list $(a \in \mathbb{R}^3, \phi \in \mathbb{R}, \lambda \in \mathbb{R}, t \in \mathbb{R})_{n \in \mathbb{N}}$. Here, a denotes the acceleration measured at time t in the vehicle n reference frame, that is localized at latitude $\phi$ and longitude $\lambda$. For simplicity, only $\phi$ and $\lambda$ are used to describe the spatial coordinates. Multiple-layer roads and intersections can be taken into account by adding an extra altitude $h \in \mathbb{R}$ coordinate to the state tuple.

In an exemplary aspect, the data frames from the AVs 202 are split into their corresponding acceleration $(a_t)_n$ and the state estimation information $(\phi, \lambda, t)_n$ components. In this example, the standardization processor 405 receives the acceleration $(a_t)_n$, which can be indexed by the AV 202 and the time. The standardization processor 405 is configured to correct acceleration readings $(a_t)_n$ to account for each vehicle's specific transfer function that may impact the acceleration signal (sensor model, shocks, tire pressure, load, etc.) into a standardized acceleration value $(\bar{a}_t)_n$.

The standardized acceleration value $(\bar{a}_t)_n$ is then combined with its corresponding state estimation information $(\phi, \lambda, t)_n$ to generate combined data $(\phi, \lambda, t, \bar{a})_n$. The combined data is then provided to the data aggregator 305. The controller 210 can include an adder 410 that is configured to combine the various inputs together to generate the combined data $(\phi, \lambda, t, \bar{a})_n$.

In an exemplary aspect, the standardization processor 405 is configured to dynamically compute a standardization linear transformation $T_n \in \mathbb{R}^{3 \times 3}$ for each AV 202.$n$. In an exemplary aspect, the standardization processor 405 uses a linear transform to compute the standardized acceleration value $(a_t)_n T_n = (\bar{a}_t)_n$. In this example, $T_n$ is an anisotropic scaling operation to the acceleration vector that transforms its magnitude dimension-wise:

$$T_n = \begin{bmatrix} \tau_x & 0 & 0 \\ 0 & \tau_y & 0 \\ 0 & 0 & \tau_z \end{bmatrix} = \begin{bmatrix} \dfrac{1}{\frac{1}{w}\sum_{i=t-w}^{t}(|a_x|)_i} & 0 & 0 \\ 0 & \dfrac{1}{\frac{1}{w}\sum_{i=t-w}^{t}(|a_y|)_i} & 0 \\ 0 & 0 & \dfrac{1}{\frac{1}{w}\sum_{i=t-w}^{t}(|a_z|)_i} \end{bmatrix}$$

where the scale coefficients τ are computed as the inverse of the average observed absolute value with a rolling window of size w.

In an exemplary aspect, the standardization process may also use historical information about weather or other environmental factors, make and model of the AV, make and model of the sensor, tire pressure, load, and/or other factors that would be understood by one of ordinary skill in the art.

Data Aggregation

The data aggregator 305 is configured to perform one or more data aggregation processes to index the different data frames to provide a mapping from spatio-temporal coordinates to the set of recorded acceleration values: $D(\phi, \lambda, t) \rightarrow \vec{a}_{0:n}$. The aggregator 305 is configured to aggregate the combined data $(\phi, \lambda, t, \vec{a})_n$ from AVs 202 to generate aggregated acceleration data $(\vec{a})_{\phi, \lambda, t}$ that is provided to the spatio-temporal vector field generator 310.

Figure 5:
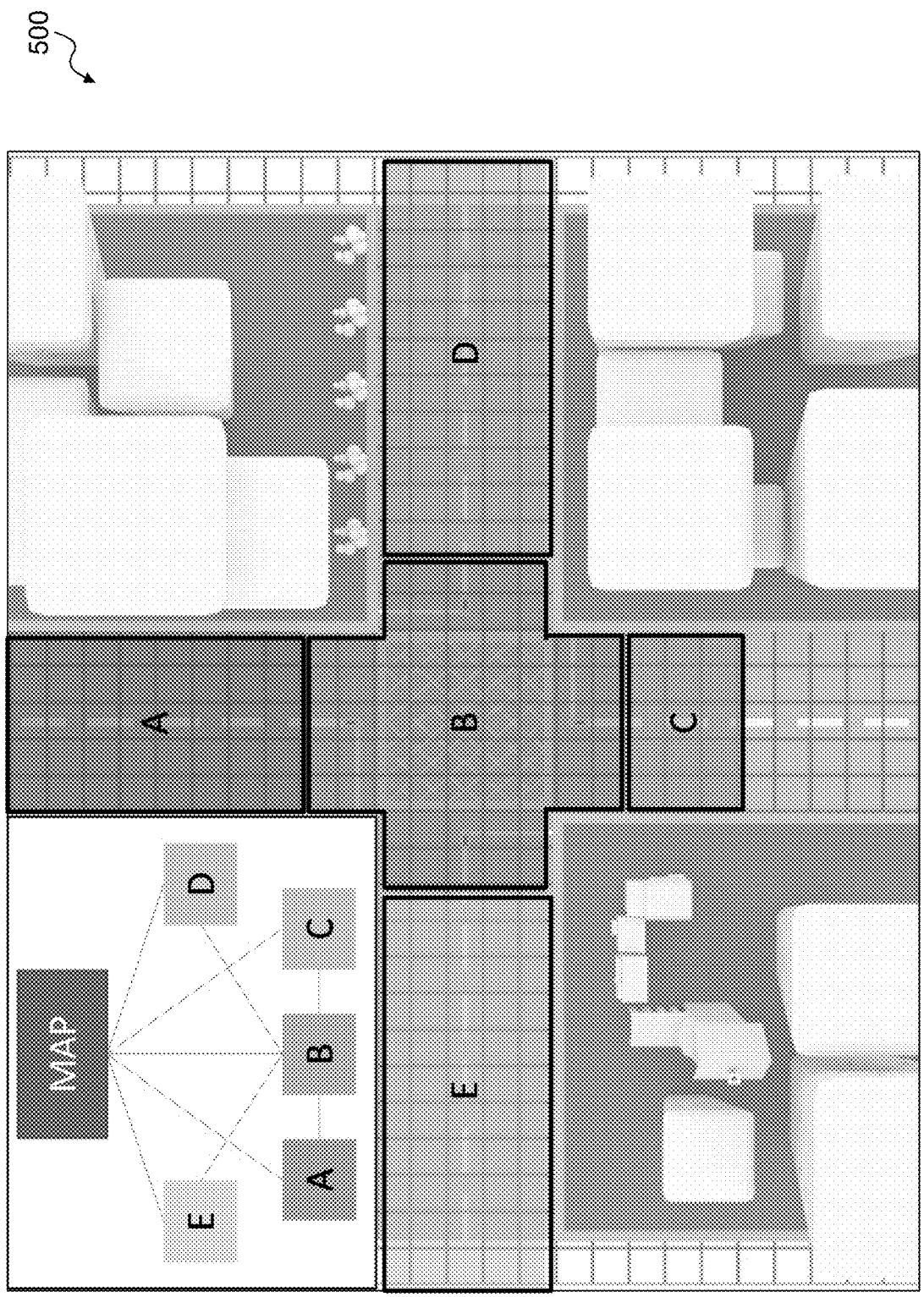
FIG. 5 illustrates a data aggregation and indexing process in accordance with an aspect of the disclosure.

In an exemplary aspect, with reference to FIG. 5, the data aggregator 305 is configured to index the acceleration information using a grid-hierarchy indexer that groups neighboring cells together for faster local access. For example, as shown in FIG. 5, grid cell groups A, B, C, D, and E have been identified, where the data aggregator 305 can index cells within each of these groups together for increased local access. The present disclosure is not limited to a grid-hierarchy index scheme and other schemes are possible as would be understood by one of ordinary skill in the art.

Vector Field Generation

In an exemplary aspect, the spatio-temporal vector field generator 310 is configured to process the aggregated acceleration data $(\hat{\vec{a}})_{\phi, \lambda, t}$ (which is indexed by latitude, longitude and time) to generate a single acceleration vector 120 for each cell 115 of the vector field map 110. The acceleration vectors 120 form the map represented by $(\hat{\vec{a}})_{\phi, \lambda, t}$ in FIG. 1. To generate the single acceleration vector 120, the spatio-temporal vector field generator 310 can perform one or more filtering processing operations, including mean filtering (e.g. compute the average acceleration value from all the readings) and/or robust probabilistic filtering (e.g. a probabilistic outlier rejection method that computes the expected acceleration value by computing the mean after rejecting the outliers).

In an exemplary aspect, the spatio-temporal vector field generator 310 calculates an acceleration vector field V based on a selected summary statistic method for all the cells 115 in the subspace of interest $\mathbb{S} \in \mathbb{R}^3$. $V = D(\phi_{s_0}, \lambda_{s_1}, t_{s_2}); \forall s \in \mathbb{S}$ and $V(\phi, \lambda, t) \rightarrow \hat{\vec{a}}$.

In an exemplary aspect, the spatio-temporal vector field generator 310 is configured to, for each cell 115, summarize a corresponding set of acceleration values in a single acceleration vector. In this example, for each cell 115, a set of acceleration values is indexed by latitude, longitude and time: $D(\phi, \lambda, t) \rightarrow \vec{a}_{0:n}$. In an exemplary aspect, the spatio-temporal vector field generator 310 is configured to compute the vector field based on mean filtering and/or robust probabilistic filter. For mean filtering, the spatio-temporal vector field generator 310 is configured to compute the average acceleration value from all the sensor readings within the corresponding cell 115. Mean filtering provides a fast computation, but may be influenced by one or more outliers (e.g. generated by faulty sensors). For robust probabilistic filtering, a probabilistic outlier rejection method computes the expected acceleration value by computing the mean after rejecting the outliers. In an exemplary aspect, the spatio-temporal vector field generator 310 is configured to perform the mean filtering as a faster, initial filtering. The map can be updated based on the more accurate robust probabilistic filtering.

Figure 9:
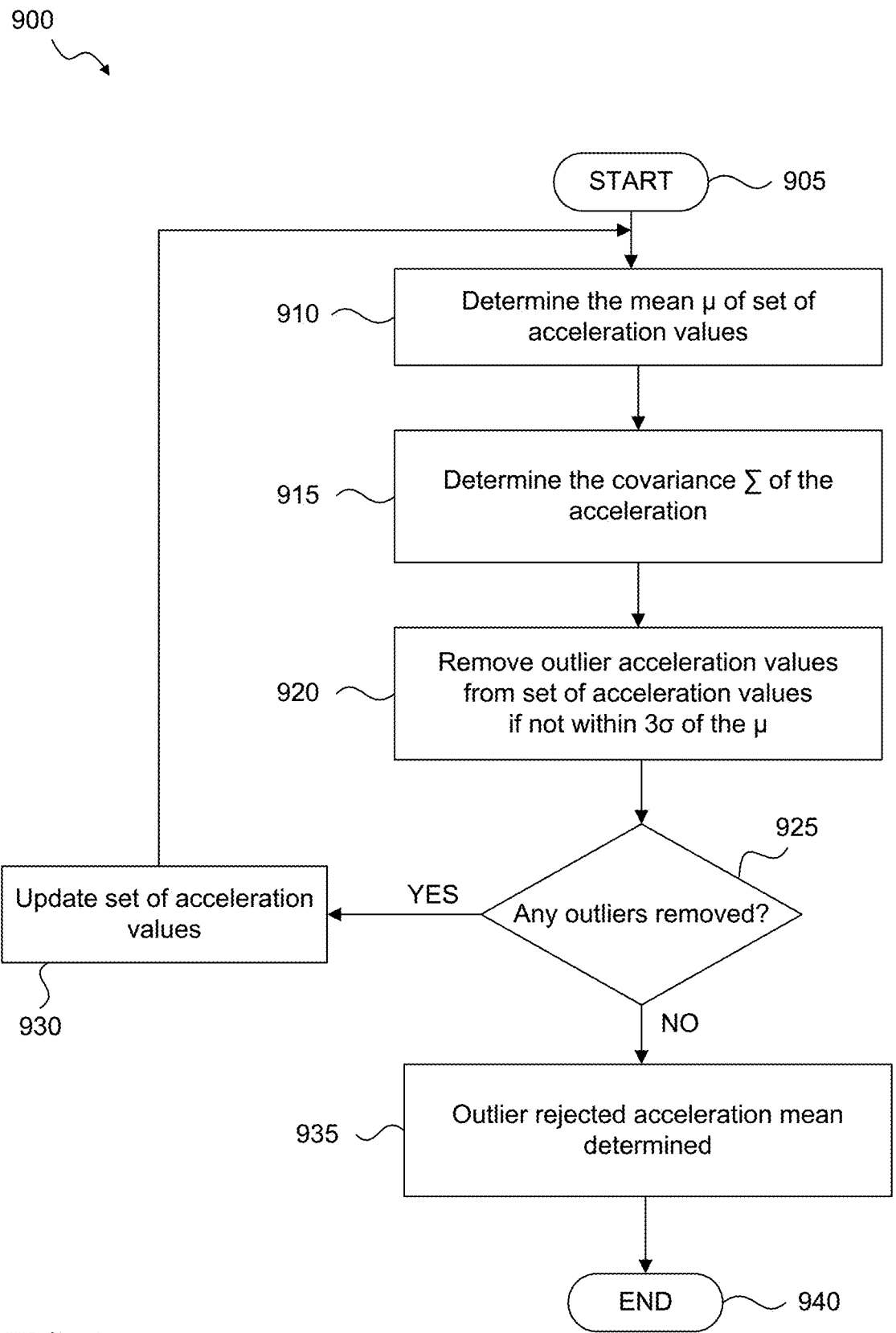
FIG. 9 illustrates a flowchart of a robust probabilistic filtering method in accordance with an aspect of the disclosure.

The robust probabilistic filtering process according to an exemplary aspect is illustrated in the flowchart shown in FIG. 9. The filtering process includes determining the mean of a set of acceleration values ($\mu$=mean(a)) at operation 910. At operation 915, the covariance of the mean values is determined ($\Sigma$=cov(a)). At operation 920, outlier acceleration values are removed from the set of acceleration values. Here, an acceleration value is determined to be an outlier if the value is three standard deviations (3σ) from the mean. At operation 925, it is determined if any outliers were removed from the set of acceleration values. If no outliers were removed, the filtered acceleration value is identified at operation 935, and the process ends. If one or more outliers are removed from the set of acceleration values, the flowchart returns to operation 910, where the flowchart is repeated until no outliers are removed. In an exemplary aspect, the robust probabilistic filtering can include fitting a multivariate Gaussian to the available data prior to the calculation of the mean and covariance.

Figure 6:
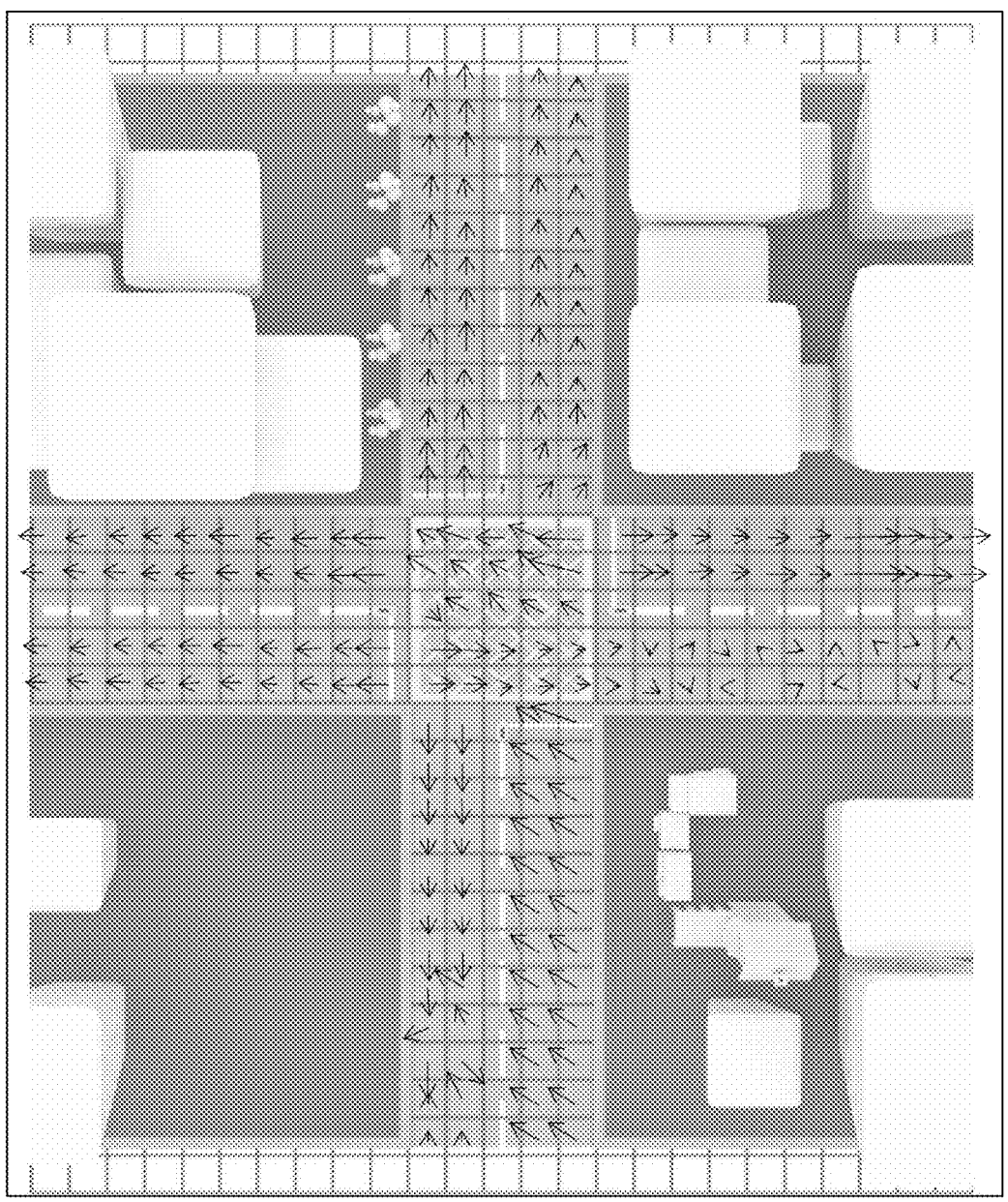
FIG. 6 illustrates an acceleration vector field map in accordance with an aspect of the disclosure.

An example acceleration vector field map 600 that is generated by the spatio-temporal vector field generator 310 based on the filtered acceleration values is shown in FIG. 6. In FIG. 6, the discretization step $\delta_x$ is 4 m (but is not limited thereto) and the acceleration vectors are projected onto a two-dimensional (2D) plane.

Magnitude and Frequency Analysis

The vector field map 600 is then provided to the frequency analyzer 315 and the magnitude analyzer 320.

The magnitude analyzer 320 can filter the magnitude of the acceleration vectors of the corresponding cells to determine cells/locations where the magnitude of the acceleration exceeds a threshold value, which may be indicative of road and/or traffic conditions.

Figure 7B:
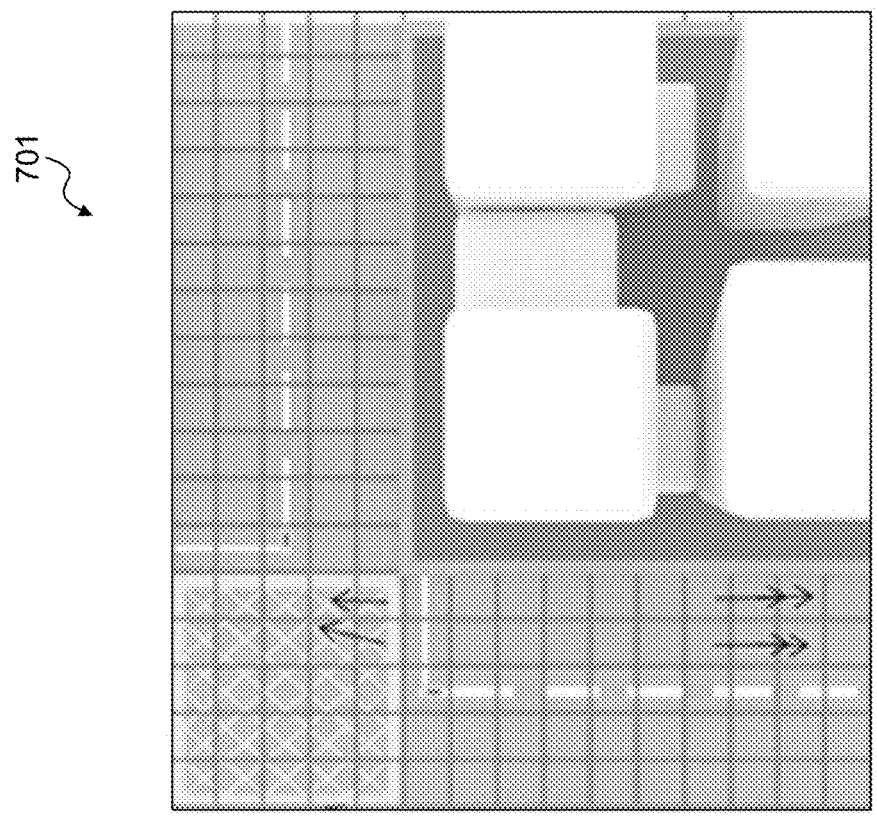
FIG. 7B illustrates the portion of the acceleration vector field map of FIG. 7A following a vector magnitude filtering in accordance with an aspect of the disclosure.
Figure 7A:
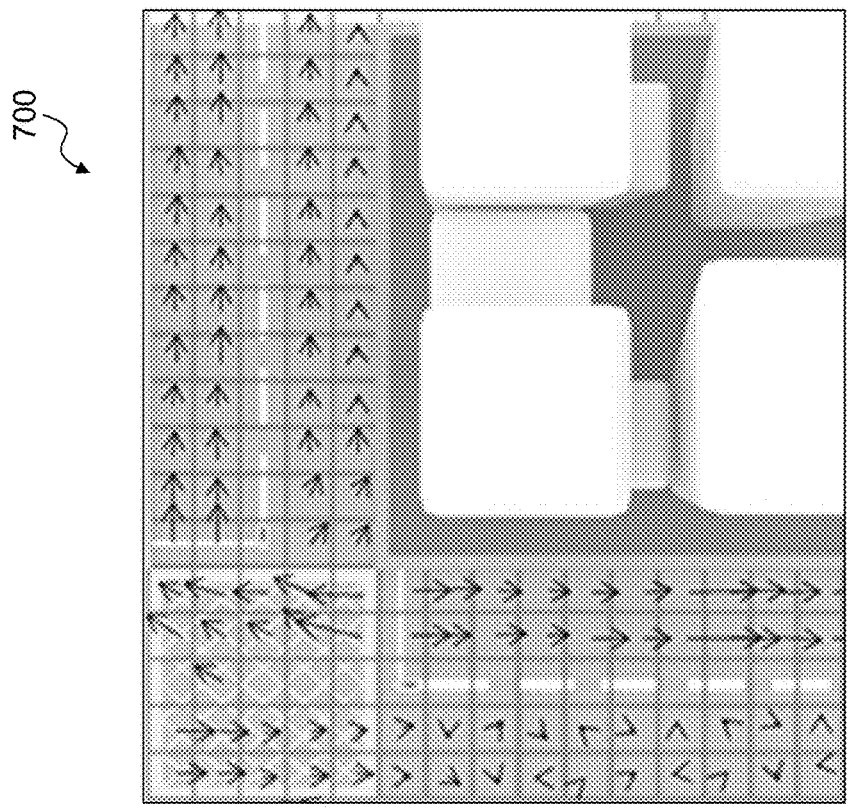
FIG. 7A illustrates a portion of the acceleration vector field map of FIG. 6 in accordance with an aspect of the disclosure.

A portion 700 of the vector field map 600 is shown FIG. 7A. Following a magnitude filtering, low magnitude acceleration values are filtered out, and the resulting vector field map 701 is shown in FIG. 7B. With the high magnitude acceleration values identified, the magnitude analyzer 320 can generate an output signal $(\phi, \lambda, t)_Q$ corresponding to the analyzed magnitude values with magnitudes that exceed the threshold value, and may be indicative of indicative of possible road and/or traffic conditions.

Figure 8C:
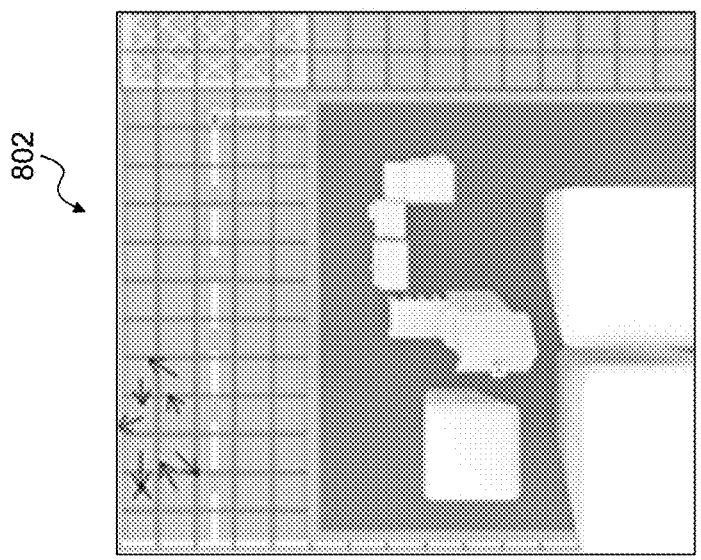
FIG. 8C illustrates the portion of the acceleration vector field map of FIG. 8B following a noise removal filtering in accordance with an aspect of the disclosure.
Figure 8B:
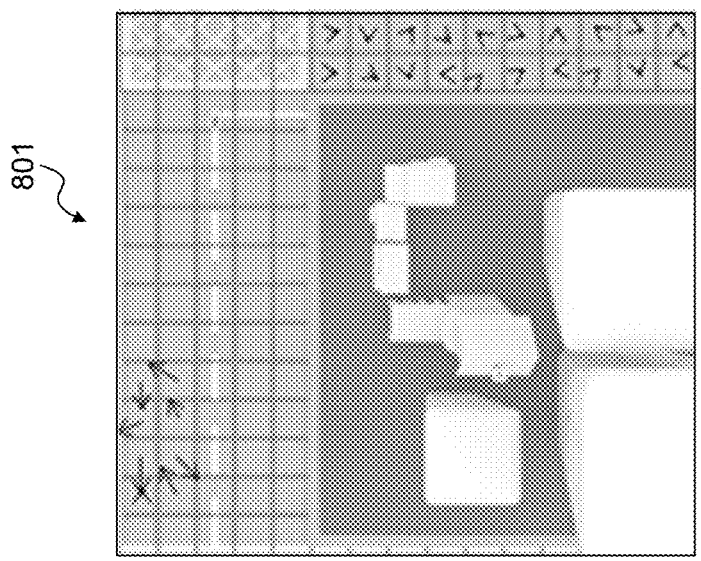
FIG. 8B illustrates the portion of the acceleration vector field map of FIG. 8A following a high-pass frequency filtering in accordance with an aspect of the disclosure.
Figure 8A:
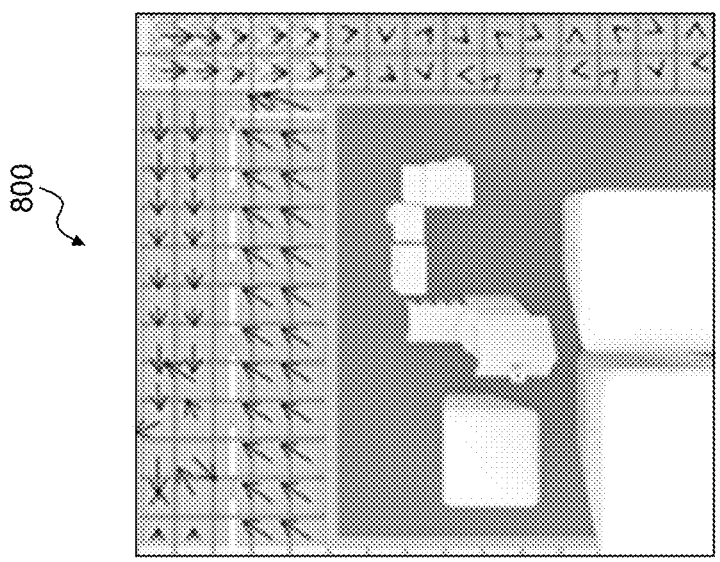
FIG. 8A illustrates a portion of the acceleration vector field map of FIG. 6 in accordance with an aspect of the disclosure.

The frequency analyzer 315 can be configured to perform one or more frequency processing operations, such as a Clifford Fourier transformation, on the acceleration data as shown in FIGS. 8A-8C. FIG. 8A shows a portion 800 of the vector field map 600. FIG. 8B shows filtered acceleration values 801 following a high-pass frequency filtering. FIG. 8C shows filtered acceleration values 802 that have been filtered using a robust filtering. In this example, a high-pass filter may be applied to the Clifford Fourier transform to determine cells/locations that include high frequency components of the vector field.

FIG. 8B illustrates that the high-pass frequency filtering can be sensitive to noise, especially when the acceleration is low and the SNR (signal-to-noise ratio) is low. The robust frequency filtering can include the high-pass frequency filtering followed by an exclusion of noise based on the magnitude. FIG. 8C shows the cells that have been identified with the noise removed by discarding those vectors having magnitudes less than a noise threshold value.

In an exemplary aspect, high frequency components correspond to cell where the acceleration values are fast changing. These fast changing acceleration values may indicate possibly anomalies in the vector field, which may be caused by, for example, poor road conditions. The frequency analyzer 315 can generate an output signal $(\phi, \lambda, t)_F$ corresponding to the analyzed frequencies for the respective cell.

The output signal of the frequency analyzer 315 and/or the output signal of the magnitude analyzer 320 can be used by the MGS 205 to, for example, determine analytics about the traffic and road conditions, identify driving behavior of one or more AVs to improve predictive motion models and/or enhance navigation algorithms. The output signal of the frequency analyzer 315 and/or the output signal of the magnitude analyzer 320 can additionally or alternatively be provided (e.g. wirelessly communicated) to one or more AVs 202 by the MGS 205

Figure 10:
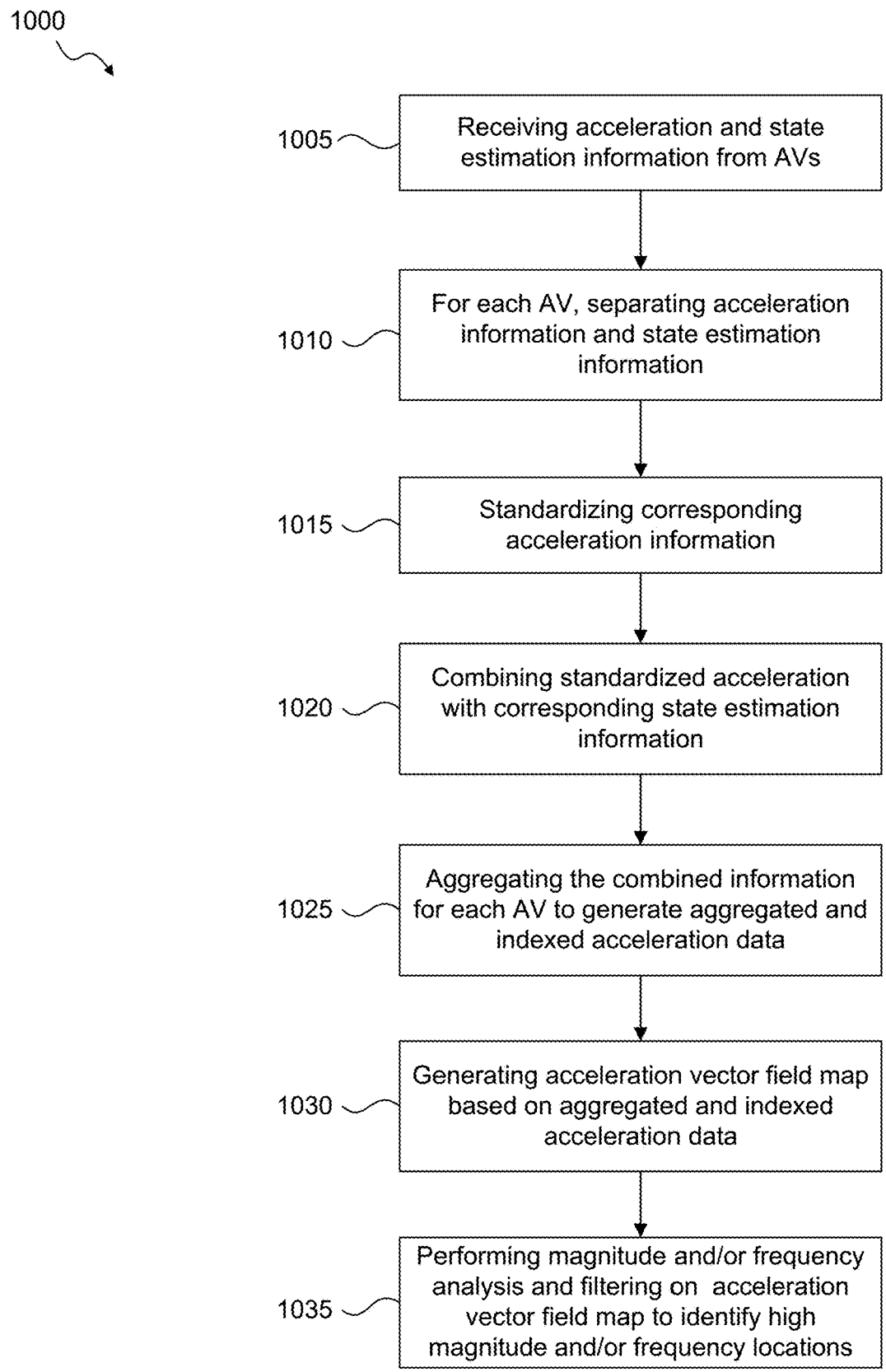
FIG. 10 illustrates a flowchart of a map generation method in accordance with an aspect of the disclosure.

FIG. 10 illustrates a map generation method 1000 according to an exemplary aspect of the present disclosure. The flowchart 1000 is described with continued reference to FIGS. 1-9. The operations of the method are not limited to the order described below, and the various operations may be performed in a different order. Further, two or more operations of the methods may be performed simultaneously with each other.

The flowchart 1000 begins with operations 1005, where acceleration information and state estimation information is received from one or more AVs 202. In an exemplary aspect, the MGS 205 is configured to receive sensor data and state estimation information from the AVs 202, where the information can be obtained by the corresponding AVs 202 from one or more sensors (e.g. sensors 260—FIG. 2B). The sensor can be an IM sensor that is configured to detect an acceleration of the AV 202. The acceleration information and state estimation information can be crowdsourced by the AVs After operation 1005, the flowchart 1000 transitions to operation 1010, where the acceleration information and state estimation information are separated. This operation can be performed for each set of acceleration and state estimation information received from a corresponding AV 202.

After operation 1010, the flowchart 1000 transitions to operation 1015, where the separated acceleration information is standardized. In an exemplary aspect, the standardization processor 405 corrects the acceleration information $(a_t)_n$ to account for vehicle-specific transfer functions that may impact the acceleration signal (sensor model, shocks, tire pressure, load, etc.). The standardization process generates a standardized acceleration value $(\bar{a}_t)_n$.

After operation 1015, the flowchart 1000 transitions to operation 1020, each of the standardized accelerations are recombined with their corresponding state estimation information to generate combined information/data.

After operation 1020, the flowchart 1000 transitions to operation 1025, where the combined information for each AV is aggregated to generate aggregated and indexed acceleration data. In an exemplary aspect, the data aggregator 305 is configured to perform one or more data aggregation processes to index the different data frames to provide a mapping from spatio-temporal coordinates to the set of recorded acceleration values. The data aggregator 305 aggregates the combined data $(\phi, \lambda, t, \bar{a})_n$ from AVs 202 to generate aggregated acceleration data $(\hat{\vec{a}})_{\phi, \lambda, t}$ that is provided to the spatio-temporal vector field generator 310.

After operation 1025, the flowchart 1000 transitions to operation 1030, where the acceleration vector field map is generated based on aggregated and indexed acceleration data. In an exemplary aspect, the spatio-temporal vector field generator 310 is configured to process the aggregated acceleration data $(\hat{\vec{a}})_{\phi, \lambda, t}$ (which is indexed by latitude, longitude and time) to generate a single acceleration vector 120 for each cell 115 of the vector field map 110.

After operation 1030, the flowchart 1000 transitions to operation 1035, where magnitude and/or frequency analysis and filtering is performed on acceleration vector field map to identify high magnitude and/or frequency cells within the map. In an exemplary aspect, the magnitude analyzer 320 can filter the magnitude of the acceleration vectors of the corresponding cells to determine cells/locations where the magnitude of the acceleration exceeds a threshold value, which may be indicative of road and/or traffic conditions. The frequency analyzer 315 can perform one or more frequency processing operations, such as a Clifford Fourier transformation, on the acceleration data to determine cells/locations that include high frequency components of the vector field, which may be indicative of road and/or traffic conditions. The analyzed map can be used by the MGS 205 to compute analytics about the traffic and road conditions, provide prior knowledge about the driving behavior of other vehicles to improve predictive motion models, and enhance navigation algorithms. The information obtained from the map analysis can be provided to one or more AVs 202 and/or one or more other systems or devices within the autonomous driving environment.

EXAMPLES

The following examples pertain to further aspects.

Example 1 is a map generation system, comprising: a data aggregator configured to aggregate data received from one or more autonomous vehicles (AVs) to generate aggregated data; a vector-field generator configured to generate a vector-field map including a plurality of cells based on the aggregated data, each cell having a corresponding vector; and analyzer configured to: analyze the vector-field map to identify one or more vectors of the plurality of cells exceeding one or more predetermined threshold values; and generate an analyzed signal corresponding to the identified one or more vectors and provide the analyzed signal to the one or more AVs.

Example 2 is the subject matter of Example 1, wherein the data received from the one or more AVs is respective acceleration data of the one or more AVs.

Example 3 is the subject matter of any of Examples 1-2, wherein the acceleration data of the one or more AVs includes corresponding time data and location data.

Example 4 is the subject matter of any of Examples 1-3, wherein the data received from the one or more AVs is acceleration data detected by an inertial measurement sensor of the one or more AVs.

Example 5 is the subject matter of any of Examples 1-4, wherein the data received from the one or more AVs comprises state estimation information and acceleration information.

Example 6 is the subject matter of any of Examples 1-5, further comprising a standardization processor that is configured to standardize the acceleration information to generate standardized acceleration information, wherein the data aggregator is configured to aggregate state estimation information and the standardized acceleration information to generate the aggregated data.

Example 7 is the subject matter of Example 6, wherein the standardization processor is configured to perform a linear transform on the acceleration information to generate the standardized acceleration information.

Example 8 is the subject matter of any of Examples 1-7, wherein the vector-field generator is configured to perform a mean filtering and/or a probabilistic filtering on the aggregated data to generate the vector-field map.

Example 9 is the subject matter of any of Examples 1-8, wherein the one or more predetermined threshold values comprise a magnitude threshold value and/or a frequency threshold value.

Example 10 is the subject matter of any of Examples 1-9, wherein the analyzer is configured to analyze a magnitude and/or a frequency of vectors of the vector-field map to identify the one or more vectors that exceeding a predetermined magnitude threshold value and/or frequency threshold value.

Example 11 is a non-transitory computer-readable storage medium with an executable computer program stored thereon, the program instructing a processor to: aggregate data received from one or more autonomous vehicles (AVs) to generate aggregated data; generate a vector-field map including a plurality of cells based on the aggregated data, each cell having a corresponding vector; analyze the vector-field map to identify one or more vectors of the plurality of cells exceeding one or more predetermined threshold values; and generate an analyzed signal corresponding to the identified one or more vectors and provide the analyzed signal in electronic form as a data file.

Example 12 is the subject matter of Example 11, wherein the data received from the one or more AVs is respective acceleration data of the one or more AVs.

Example 13 is the subject matter of Example 12, wherein the acceleration data of the one or more AVs includes corresponding time data and location data.

Example 14 is the subject matter of any of Examples 11-13, wherein the data received from the one or more AVs is acceleration data detected by an inertial measurement sensor of the one or more AVs.

Example 15 is the subject matter of any of Examples 11-14, wherein the data received from the one or more AVs comprises state estimation information and acceleration information.

Example 16 is the subject matter of Examples 15, wherein the program further instructs the processor to standardize the acceleration information to generate standardized acceleration information, wherein the state estimation information and the standardized acceleration information are aggregated to generate the aggregated data.

Example 17 is the subject matter of Example 16, wherein standardizing the acceleration information includes performing a linear transform on the acceleration information to generate the standardized acceleration information.

Example 18 is the subject matter of any of Examples 11-17, wherein generating the vector-field map includes performing a mean filtering and/or a probabilistic filtering on the aggregated data to generate the vector-field map.

Example 19 is the subject matter of any of Examples 11-18, wherein the one or more predetermined threshold values comprise a magnitude threshold value and/or a frequency threshold value.

Example 20 is the subject matter of any of Examples 11-19, wherein the analyzing the vector-field map comprises analyzing a magnitude and/or a frequency of vectors of the vector-field map to identify the one or more vectors that exceeding a predetermined magnitude threshold value and/or frequency threshold value.

Example 21 is an autonomous vehicle (AV), comprising: an inertial measurement sensor configured to detect acceleration data of the AV; a communication interface that is configured to: transmit the detected acceleration data to a map generation system; and receive, from the map generation system, a vector-field map that includes including a plurality of cells or vector-field map information determined from the vector-field map, the vector-field map being generated based on the detected acceleration data, wherein each cell has a corresponding vector; and a controller configured to control the AV based on the vector-field map or the information determined from the vector-field map.

Example 22 is the subject matter of Example 21, wherein the acceleration data includes corresponding time data and location data.

Example 23 is the subject matter of any of Examples 21-22 wherein the communication interface is further configured to transmit state estimation information of the AV to the map generation system, wherein the vector-field map or the vector-field map information is generated based on the acceleration data and the state estimation information.

Example 24 is an autonomous vehicle system, comprising: one or more autonomous vehicles (AVs); and a map generation system that includes: a data aggregator configured to aggregate data received from the one or more AVs to generate aggregated data; a vector-field generator configured to generate a vector-field map including a plurality of cells based on the aggregated data, each cell having a corresponding vector; and analyzer configured to: analyze the vector-field map to identify one or more vectors of the plurality of cells exceeding one or more predetermined threshold values; and generate an analyzed signal corresponding to the identified one or more vectors and provide the analyzed signal to the one or more AVs.

Example 25 is the subject matter of Example 24, wherein the one or more AVs each include an inertial measurement sensor configured to detect acceleration data, wherein the data received from the one or more AVs is the acceleration data detected by the inertial measurement sensor.

Example 26 is a map generation method, comprising: aggregating data received from one or more autonomous vehicles (AVs) to generate aggregated data; generating a vector-field map including a plurality of cells based on the aggregated data, each cell having a corresponding vector; analyzing the vector-field map to identify one or more vectors of the plurality of cells exceeding one or more predetermined threshold values; and generating an analyzed signal corresponding to the identified one or more vectors and providing the analyzed signal in electronic form as a data file (e.g. to the AVs).

Example 27 is the subject matter of Example 26, wherein the data received from the one or more AVs is respective acceleration data of the one or more AVs.

Example 28 is the subject matter of Example 27, wherein the acceleration data of the one or more AVs includes corresponding time data and location data.

Example 29 is the subject matter of any of Examples 26-28, wherein the data received from the one or more AVs is acceleration data detected by an inertial measurement sensor of the one or more AVs.

Example 30 is the subject matter of any of Examples 26-29, wherein the data received from the one or more AVs comprises state estimation information and acceleration information.

Example 31 is the subject matter of Examples 30, further comprising standardizing the acceleration information to generate standardized acceleration information, wherein the state estimation information and the standardized acceleration information are aggregated to generate the aggregated data.

Example 32 is the subject matter of Example 31, wherein standardizing the acceleration information includes performing a linear transform on the acceleration information to generate the standardized acceleration information.

Example 33 is the subject matter of any of Examples 26-32, wherein generating the vector-field map includes performing a mean filtering and/or a probabilistic filtering on the aggregated data to generate the vector-field map.

Example 34 is the subject matter of any of Examples 26-33, wherein the one or more predetermined threshold values comprise a magnitude threshold value and/or a frequency threshold value.

Example 35 is the subject matter of any of Examples 26-34, wherein the analyzing the vector-field map comprises analyzing a magnitude and/or a frequency of vectors of the vector-field map to identify the one or more vectors that exceeding a predetermined magnitude threshold value and/or frequency threshold value.

Example 36 is a non-transitory computer-readable storage medium with an executable computer program stored thereon, the program instructing a processor to perform the operations of any of Examples 26-35.

Example 37 is a computer program product having a computer program which is directly loadable into a memory of a controller, when executed by the controller, causes the controller to perform the operations of any of Examples 26-35.

Example 38 is an apparatus as shown and described.

Example 39 is a method as shown and described.

Example 40 is a non-transitory computer-readable storage medium with an executable computer program stored thereon, the program instructing a processor to perform the method of Example 39.

Example 41 is a computer program product having a computer program which is directly loadable into a memory of a controller, when executed by the controller, causes the controller to perform the method of Example 39.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, programmable processing circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Various aspects herein may utilize one or more machine learning models to perform corresponding functions of the MGS 205, the AVs 202, an AV stack, and/or one or more other functions described herein. A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

What is claimed is:

1. A map generation system, comprising:
   a transceiver configured to receive historical data from one or more autonomous vehicles (AVs), wherein the historical data includes state estimation information and acceleration information;
   a controller configured to:
   aggregate the historical data received from the one or more AVs, to index one or more acceleration values of the acceleration information to corresponding one or more state values of the state estimation information, to generate aggregated data;
   generate a vector-field map segmented into a plurality of location-based cells based on the aggregated data, the generation of the vector-field map including:
   mapping the one or more acceleration values of the acceleration information to each of the plurality of location-based cells based on the respective one or more state values of the state estimation information; and
   processing the mapped one or more acceleration values to generate respective acceleration vectors for the plurality of location-based cells;
   analyze the vector-field map to identify one or more of the acceleration vectors exceeding one or more predetermined threshold values to generate analysis information corresponding to the identified one or more vectors; and
   transmit the analysis information to the one or more AVs using the transceiver, wherein at least one of the one or more AVs adapt its operation based on the received analysis information.

2. The map generation system of claim 1, wherein the state estimation information includes corresponding time data and location data.

3. The map generation system of claim 1, wherein the acceleration information includes acceleration data detected by an inertial measurement sensor of the one or more AVs.

4. The map generation system of claim 1, wherein the controller comprises: a standardization processor that is configured to standardize the acceleration information to generate standardized acceleration information, and a data aggregator that is configured to aggregate the state estimation information and the standardized acceleration information to generate the aggregated data.

5. The map generation system of claim 4, wherein the controller is configured to separate the received historical data into the acceleration information and the state estimation information to separately provide the acceleration information to the standardization processor and the state estimation information to the data aggregator.

6. The map generation system of claim 1, wherein the controller is configured to perform a mean filtering and/or a probabilistic filtering on the aggregated data to generate the vectors of the respective cells of the vector-field map.

7. The map generation system of claim 1, wherein the one or more predetermined threshold values comprise a magnitude threshold value and/or a frequency threshold value.

8. The map generation system of claim 1, wherein the controller is configured to analyze a magnitude and/or a frequency of the vectors of the vector-field map to identify the one or more vectors that exceed a predetermined magnitude threshold value and/or frequency threshold value.

9. The map generation system of claim 1, wherein each of the plurality of location-based cells comprises a single acceleration vector.

10. The map generation system of claim 1, wherein the plurality of location-based cells are arranged in a grid to form the vector-field map.

11. The map generation system of claim 1, wherein the controller is configured to perform a first filtering operation and a second filtering operation on the mapped one or more acceleration values to generate respective acceleration vectors for the plurality of location-based cells, wherein the second filtering operation is slower but more accurate than the first filtering operation.

12. The map generation system of claim 1, wherein the controller is configured to:
  determine a rate-of-change of the acceleration vectors within a cell of the plurality of location-based cells; and
  determine a magnitude of the acceleration vectors within a cell of the plurality of location-based cells, the one or more of the acceleration vectors being identified based on the determined rate-of-change of the acceleration vectors and the magnitude of the acceleration vectors.

13. A non-transitory computer-readable storage medium with an executable computer program stored thereon, the program instructing a processor to:
  receive historical data from one or more autonomous vehicles (AVs) using a transceiver, wherein the historical data includes state estimation information and acceleration information;
  aggregate the historical data received from the one or more AVs, to index one or more acceleration values of the acceleration information to corresponding one or more state values of the state estimation information, to generate aggregated data;
  generate a vector-field map segmented into a plurality of location-based cells based on the aggregated data, the generation of the vector-field map including:
    mapping the one or more acceleration values of the acceleration information to each of the plurality of location-based cells based on the respective one or more state values of the state estimation information; and
    processing the mapped one or more acceleration values to generate respective acceleration vectors for the plurality of location-based cells;
  analyze the vector-field map to identify one or more of the acceleration vectors exceeding one or more predetermined threshold values to generate analysis information corresponding to the identified one or more vectors; and
    transmit the analysis information to the one or more AVs using the transceiver, wherein at least one of the one or more AVs adapt its operation based on the received analysis information.

14. The non-transitory computer-readable storage medium of claim 13, wherein the state estimation information includes corresponding time data and location data.

15. The non-transitory computer-readable storage medium of claim 13, wherein the acceleration information includes acceleration data detected by an inertial measurement sensor of the one or more AVs.

16. The non-transitory computer-readable storage medium of claim 13, wherein the program further instructs the processor to: standardize the acceleration information to generate standardized acceleration information, aggregate the state estimation information and the standardized acceleration information to generate the aggregated data.

17. The non-transitory computer-readable storage medium of claim 16, wherein standardizing the acceleration information includes performing a linear transform on the acceleration information to generate the standardized acceleration information.

18. The non-transitory computer-readable storage medium of claim 13, wherein generating the vector-field map includes performing a mean filtering and/or a probabilistic filtering on the aggregated data to generate the vectors of the respective cells of the vector-field map.

19. The non-transitory computer-readable storage medium of claim 13, wherein the one or more predetermined threshold values comprise a magnitude threshold value and/or a frequency threshold value.

20. The non-transitory computer-readable storage medium of claim 13, wherein the analyzing the vector-field map comprises analyzing a magnitude and/or a frequency of the vectors of the vector-field map to identify the one or more vectors that exceed a predetermined magnitude threshold value and/or frequency threshold value.

21. An autonomous vehicle (AV), comprising:
  an inertial measurement sensor configured to detect acceleration data of the AV;
  a controller configured to index the detected acceleration data to state estimation information including respective locations at which the acceleration data was detected; and
  a transceiver that is configured to:
    transmit the detected acceleration data and corresponding state estimation information to a map generation system; and
    receive, from the map generation system, a vector-field map segmented into a plurality of location-based cells, the vector-field map being generated based on the detected acceleration data and the state estimation information, the acceleration data being mapped to a cell of the location-based cells associated with a location corresponding to the state estimation information, wherein each of the cells includes an acceleration vector determined based on the acceleration data and the state estimation information,
  wherein the controller is further configured to control the AV based on the vector-field map.

22. The AV of claim 21, wherein the state estimation data further includes corresponding time data.

23. An autonomous vehicle system, comprising:
  one or more autonomous vehicles (AVs); and
  a map generation system that includes a controller configured to:
    aggregate historical data received from the one or more AVs to generate aggregated data, the historical data including state estimation information and acceleration information, wherein the aggregation of the historical data includes indexing one or more acceleration values of the acceleration information to corresponding one or more state values of the state estimation information;
    generate a vector-field map segmented into a plurality of location-based cells based on the aggregated data, the generation of the vector-field map including:
      mapping the one or more acceleration values of the acceleration information to each of the plurality of location-based cells based on the respective one or more state values of the state estimation information; and
      processing the mapped one or more acceleration values to generate respective acceleration vectors for the plurality of location-based cells;
    analyze the vector-field map to identify one or more of the acceleration vectors exceeding one or more predetermined threshold values; and
    generate analysis information corresponding to the identified one or more vectors and provide the analysis information to the one or more AVs.

24. The autonomous vehicle system of claim 23, wherein the one or more AVs each include an inertial measurement sensor configured to detect acceleration data, wherein the historical data received from the one or more AVs is the acceleration data detected by the inertial measurement sensor.

* * * * *